United States Patent [19]
Darrow

[11] 4,177,459
[45] Dec. 4, 1979

[54] FAIL-SAFE ACKNOWLEDGING CIRCUIT

[75] Inventor: John O. G. Darrow, Murrysville, Pa.

[73] Assignee: Westinghouse Air Brake Company, Swissvale, Pa.

[21] Appl. No.: 800,133

[22] Filed: May 24, 1977

[51] Int. Cl.[2] .......................................... G08B 21/00
[52] U.S. Cl. .................................. 340/519; 340/502
[58] Field of Search ............. 340/147 LP, 213.1, 502, 340/519

[56] References Cited

U.S. PATENT DOCUMENTS

| | | | |
|---|---|---|---|
| 2,462,454 | 2/1949 | Allison | 246/63 |
| 3,550,122 | 12/1970 | Siddiqi | 340/213.1 |
| 3,582,925 | 6/1971 | Porter | 340/213.1 |
| 3,582,949 | 6/1971 | Forst | 340/410 |
| 3,609,709 | 9/1971 | Sanville | 340/173 R |
| 3,623,048 | 11/1971 | Haddock | 340/213.1 |
| 3,696,356 | 10/1972 | Franke | 340/213.1 |
| 3,922,641 | 11/1975 | Gates | 340/147 LP |
| 3,978,479 | 8/1976 | Schmitz | 340/519 |
| 4,011,542 | 3/1977 | Baichtal | 340/147 LP |
| 4,072,924 | 2/1978 | Pomerantz | 340/519 |
| 4,072,925 | 2/1978 | Yashima | 340/519 |

*Primary Examiner*—Harold I. Pitts
*Attorney, Agent, or Firm*—J. B. Sotak; R. W. McIntire, Jr.

[57] ABSTRACT

A fail-safe solid-state acknowledging circuit for a cab signaling system requiring an acknowledgment after the reception of a more restrictive speed command signal employing a plurality of transistor latching circuits having a predetermined order of more restrictive significance. Each of the transistor latching circuits is coupled to one input of a separate two input OR gate while a separate a.c. transistor amplifier is coupled to the other input of each of the two input OR gates. The outputs of the OR gates along with an acknowledging switch controlled voltage are coupled to the inputs of a multiple input AND gate for normally holding the AND gate in a signal passing condition and for causing the AND gate to assume a signal blocking condition when a more restrictive speed command signal is received onboard a vehicle.

10 Claims, 5 Drawing Figures

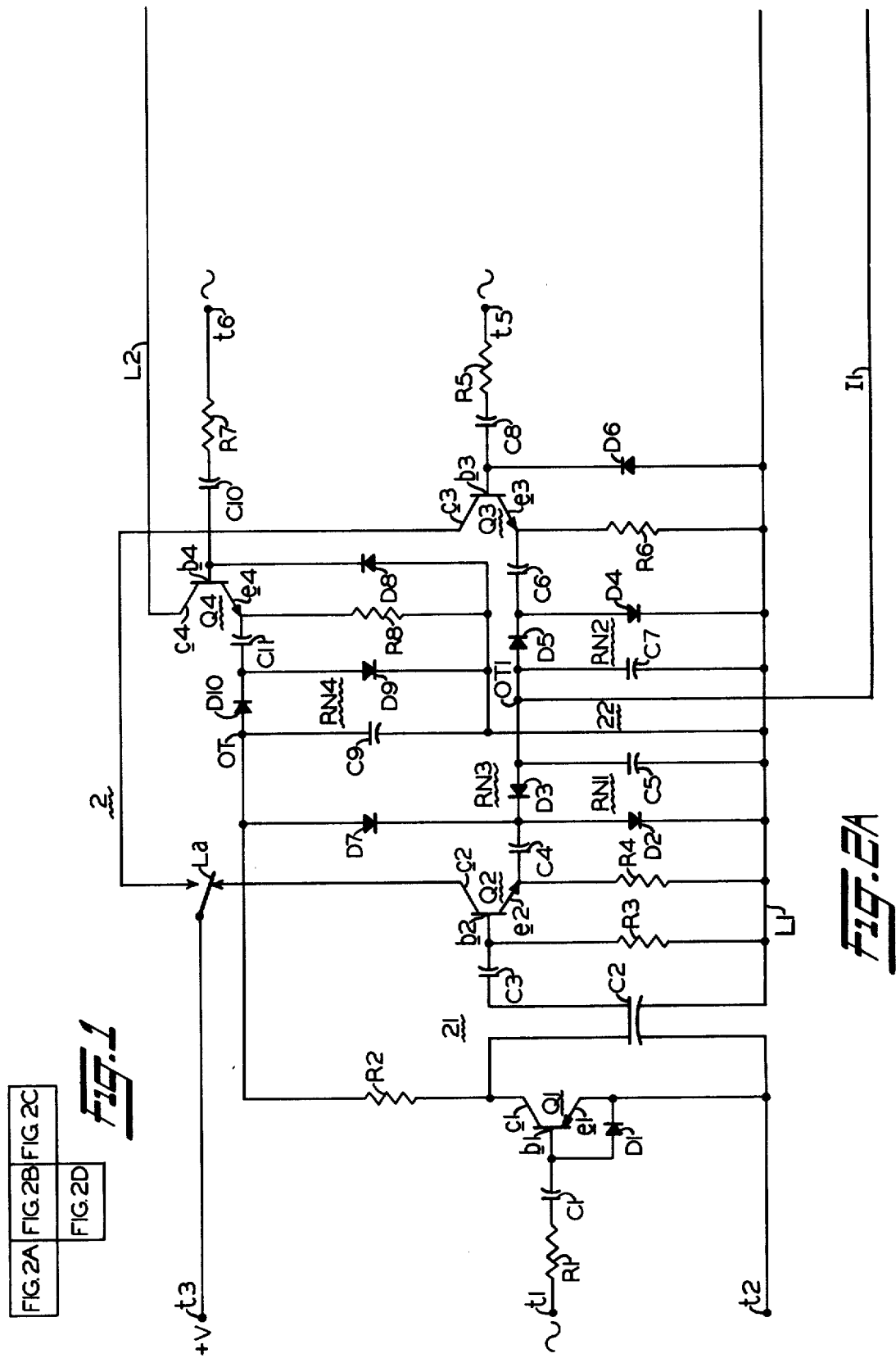

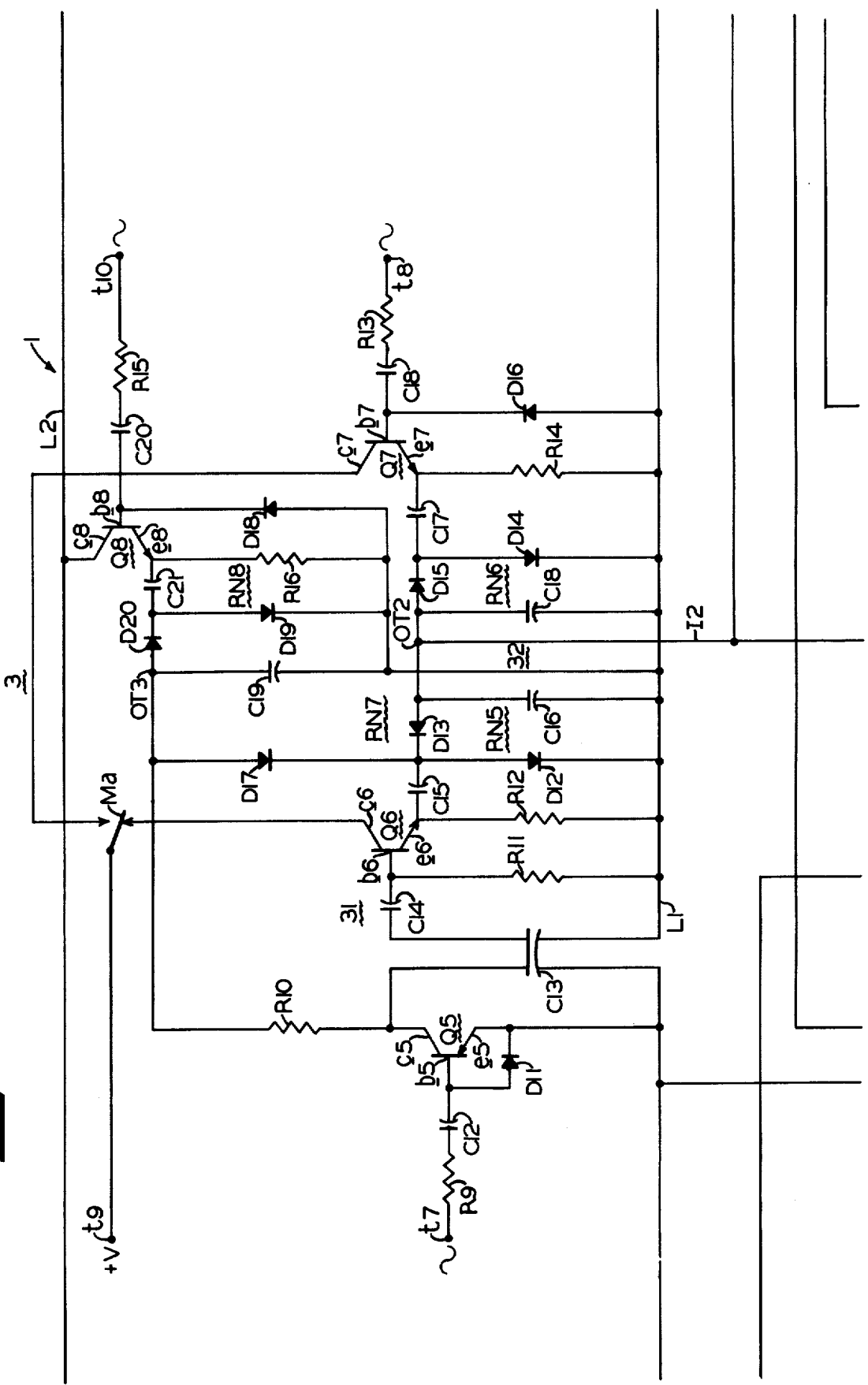

FAIL-SAFE ACKNOWLEDGING CIRCUIT

SUBJECT OF THE INVENTION

This invention relates to a fail-safe solid-state circuit arrangement for requiring the acknowledgement of the receipt of a more restrictive input signal and more particularly to a vital vehicular speed command control system including an electronic acknowledgement circuit having a first and a second output condition which assumes the second output condition when a more restrictive input signal is received onboard and which requires positive action to be taken by the operator after reception of the more restrictive input signal in order to reestablish the first output condition.

BACKGROUND OF THE INVENTION

In certain vital signaling and control systems, such as, cab signal speed control systems for railway and mass and/or rapid transit operation, various vehicle-carried apparatus and circuits are employed for being selectively responsive to one of a plurality of speed command input signals. The input signals are picked up from the wayside and each is coded to indicate the authorized speed at which the train or vehicle should be moving in any given section of track along its route of travel. The picked-up signals, which are made up of a carrier frequency and a selected one of a number of code rates or frequencies, after being amplified and demodulated, are applied to a code following relay termed the master relay. This relay, in turn, drives the code filters which are selectively responsive to the particular code rate. These filters drive decoding relays to provide a given cab signal indication to the trainman or operator in the cab of the locomotive or head vehicle. It will be appreciated that in such cab signal speed control systems, it is mandatory for the trainmen or operator to take appropriate action within a given period of time after a more restrictive speed command is received onboard from the wayside. Thus, upon reception of a more restrictive or lower speed command signal, the operator must immediately acknowledge a warning signal and begin decelerating the moving train to the newly received prescribed speed or the emergency brakes will be automatically set after an elapsed period of time to bring the train to a complete stop. It will be appreciated that the acknowledgement of the warning signal and the deceleration of the moving train or transit vehicle should take place as soon as possible after reception of a more restrictive signal in order to prevent the train or vehicle from going too fast and too far beyond a safe braking and stopping point. Further, in order to provide the highest degree of safety to individuals as well as to afford the most protection against damage to the equipment, it is essential to ensure that under no circumstance will a critical component or circuit failure be capable of producing an unsafe condition. In the past, the acknowledgement was performed by contact logic of separate vital electromagnetic relays which were activated by the pressing of the button of an acknowledgement switch after the receipt of a downward speed command which results in the deenergization of the brake relay and causes the cessation of the alarm. It will be appreciated that in order to accomplish these functions, it was previously necessary to employ three vital relays for a three-speed control system, four vital relays for a four-speed control system and so on. While these previous relay type of acknowledging circuits operated in a safe and satisfactory manner, they were extremely heavy, unduely bulky and prohibitively expensive. In order to alleviate the shortcomings of the relay circuits, it is highly advantageous to develop a solid-state electronic acknowledging circuit which is light in weight, small in size and low in cost. It will be appreciated that in addition to performing all the functions of previous electromagnetic circuits, an electronic acknowledgement circuit must also operate in a fail-safe manner. That is, any vital solid-state circuit must meet the criteria of the Association of America Railroads (A.A.R.) which define fail-safe, a term used to designate a railway signal design principle, the object of which is to eliminate the hazardous effects of a failure of a component or system. Thus, a vital piece of apparatus, circuit or system is considered to operate in a fail-safe manner when any conceivable failure of any critical component or part results in a condition at least as restrictive or as safe as that preceding the failure.

OBJECTS AND SUMMARY OF THE INVENTION

Accordingly, it is an object of this invention to provide an electronic solid-state acknowledging circuit which operates in a fail-safe manner.

A further object of this invention is to provide a fail-safe electronic acknowledging circuit arrangement which is lightweight, small and inexpensive.

Another object of this invention is to provide a new and improved electronic circuit for acknowledging the reception of a more restrictive input signal.

Still a further object of this invention is to provide an improved semiconductive acknowledging circuit which requires an acknowledgement when a more restrictive signal of a plurality of input signals is received by the acknowledging circuit.

Still another object of this invention is to provide a novel solid-state acknowledging circuit arrangement which requires the actuation of an acknowledging switch for restoring an output signal after the reception of a more restrictive Yet a further object of this invention is to provide a unique semiconductive circuit arrangement which employs a plurality of latching circuits for receiving a separate one of a plurality of input signals having a predetermined order of more restrictive significance and which has a multiple input gate circuit for producing an output signal when each of the plurality of latching circuits provide an input to the gating circuit.

Yet another object of this invention is to provide an improved fail-safe electronic acknowledging circuit which is economical in cost, simple in design, reliable in operation, durable in use, dependable in service, light in weight and small in size.

An additional object of this invention is to provide a fail-safe electronic circuit arrangement which requires an acknowledgement after the reception of a more restrictive input signal in order to reestablish an output signal including a plurality of latching circuits connected to a separate one of a plurality of input signals having a predetermined order of more restrictive signaling, one of a plurality of gating circuits cooperatively associated with a separate one of the plurality of latching circuits, and a multiple input gating circuit coupled to the plurality of latching and gating circuits for producing an output signal and conditioned upon the reception of a more restrictive input signal for causing the removal of the output signal.

In accordance with the present invention, there is provided a fail-safe electronic circuit arrangement for a cab signaling system which requires an acknowledging action on the part of a trainman when a more restrictive speed command signal is received onboard the transit vehicle. The electronic circuit includes three solid-state latching and gating circuits which are respectively responsive to a low, a medium and a high speed command signal. Each of the latching circuits includes a two stage transistor amplifier having its first stage set by a transistor amplifier and voltage doubling rectifier network which is initiated by the potential charge on a capacitor. The charge on the capacitor is established by the momentary depression of a push-button acknowledgement switch. The second amplifying stage of each latching circuit is powered by a hold voltage which is supplied to the collector electrode of the respective transistor over the back contact of the low, medium and high speed relays. A portion of the a.c. output voltage from the second stage is rectified by a voltage doubling rectifier network and is fed back to power the first stage as long as the back contact of the respective speed command relay remains closed. The a.c. output signals from the second amplifying stage are also supplied to one input of a respective two-input OR gate. The other input of each of the respective two-input OR gates is connected to a transistor amplifier which supplies a.c. signals thereto when the front contact of the respective speed command relay is closed when the low, medium and high speed relays are energized by the reception of the appropriate speed command signal. The outputs of the three OR gates are connected to the respective inputs of a four-input AND gate. The four-input AND gate includes three cascaded emitter-follower stages and a complementary transistor power output stage. Two of the three OR gates include voltage doubling rectifier networks for supplying d.c. operating voltage to two of the cascaded emitter-followers and the third OR gate includes a pair of clamping circuits for supplying a.c. input signal to the AND gate. The third emitter-follower is supplied with d.c. operating voltage by the acknowledging push-button switch when it is in its released position. Thus, the AND gate normally produces an a.c. output signal which may be employed for deactivating an alarm. However, when a more restrictive speed command is received onboard, the AND gate is disabled by one of the OR gates, and the lack of a.c. output signal activates the alarm until the operator acknowledges the reception of the more restrictive speed command by momentarily depressing the push-button acknowledging switch.

BRIEF DESCRIPTION OF THE DRAWINGS

Other objects, features and advantages of this invention will become more clearly and readily understood from the following detailed description when read in conjunction with the accompanying drawings, in which:

FIG. 1 comprises a chart showing the manner in which FIGS. 2A through 2D should be arranged in order to illustrate in detail a preferred embodiment of the present invention.

FIGS. 2A to 2D, when arranged in the manner as shown in FIG. 1, illustrates a schematic circuit diagram of the fail-safe electronic acknowledging circuit embodying the unique and novel features of the subject invention.

DETAILED DESCRIPTION OF THE INVENTION

Figure 2C:
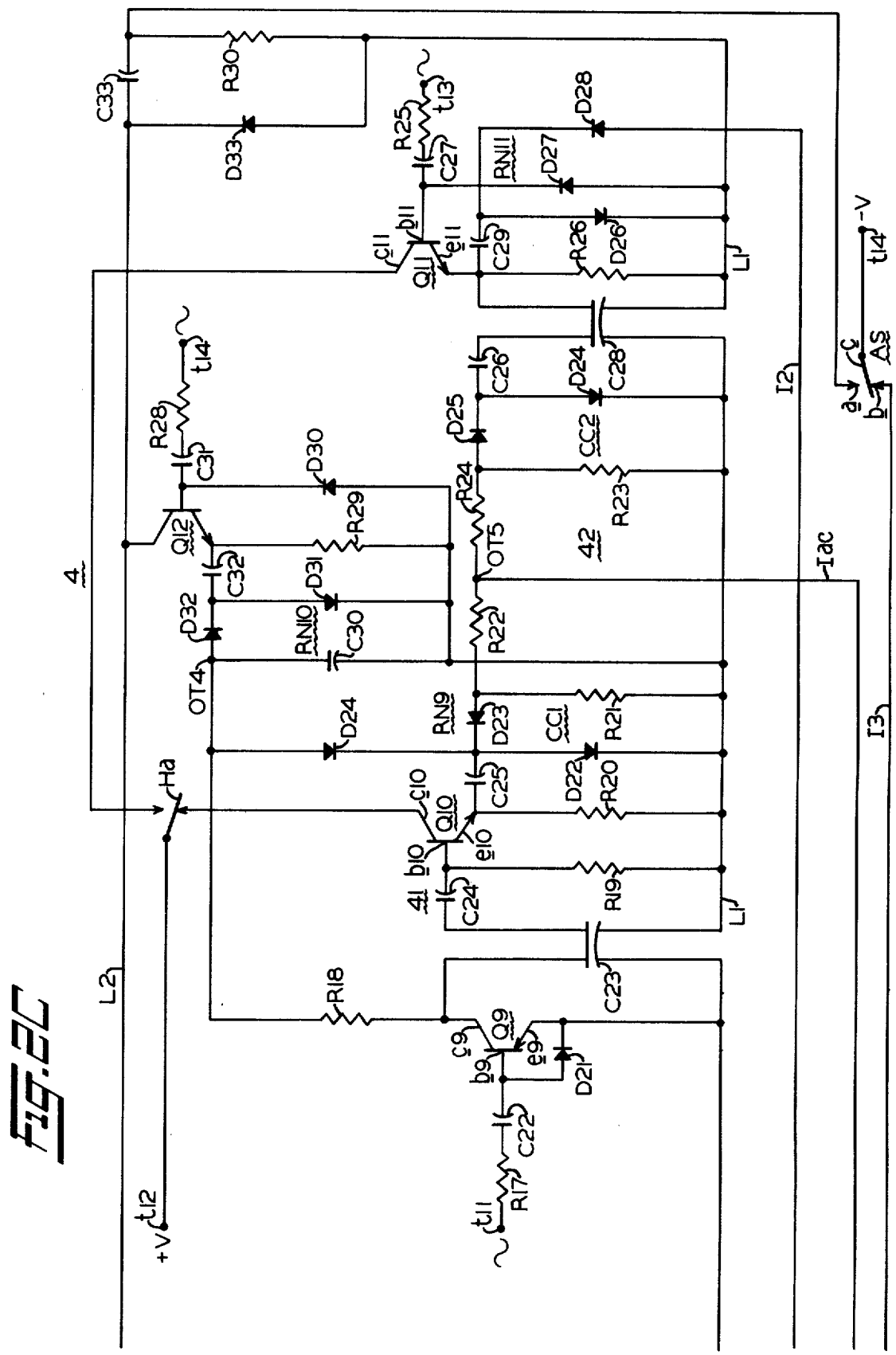

Referring now to the drawings, and in particular, to FIGS. 2A through 2D which should be set in relationship as shown in FIG. 1, there is illustrated a fail-safe or vital solid-state electronic circuit arrangement which requires an acknowledgement upon the reception of a more restrictive input input signal. For the purpose of convenience, it will be seen that the subject invention will be described in relation to a three (3) speed command cab signal system; however, it is understood that the number of speed commands may be increased or even decreased in practicing the present invention. As shown, the acknowledging circuit which is generally characterized by numeral 1, basically includes a plurality of solid-state latching and gating circuits or means 2, 3 and 4 and a multiple input solid-state gating circuit or means 5. It will be observed that the latching and gating circuits 2, 3 and 4 are similar in design and operation with exception that latching and gating circuit 4 is slightly modified, as will be described in greater detail hereinafter.

In viewing FIG. 2A, it will be noted that the circuit 2 includes a latching portion 21 and a gating portion 22. The latching circuit 21 is made up of two active stages including PNP transistor Q1 and NPN transistor Q2. The transistor Q1 includes an emitter electrode e1, a collector electrode c1 and a base electrode b1 while the transistor Q2 includes an emitter electrode e2, a collector electrode c2 and a base electrode b2. As shown, the base electrode b1 of transistor Q1 is coupled via series connected resistor R1 and capacitor C1 to input terminal t1 which is connected to a source of a.c. signals which may be derived from any convenient alternating current supply. The emitter electrode e1 is directly connected to a common input terminal t2 and is also connected to the base electrode b1 via a reverse voltage protection diode D1. The collector electrode c1 is coupled by load resistor R2 to a voltage rectifier network which provides negative operating voltage for the first stage of the latching circuit 21, as will be presently described. The a.c. output signals from the first stage are derived from the collector electrode c1 via a four-terminal capacitor C2. It will be noted that the collector electrode e1 is coupled to one of the two terminals of the upper plate of capacitor C2 while one of the two common terminals of the lower plate of capacitor C2 is coupled to common terminal t2. The other two terminals of the upper and lower plates of capacitor C2 are coupled to the input of the second stage which includes transistor Q2. It will be noted that the other terminal of the upper plate of capacitor C2 is coupled to the base electrode b2 via capacitor e3 while the other terminal of the lower plate of capacitor C2 is connected to common lead L1. The base electrode b2 is connected to common lead L1 via resistor R3. The emitter electrode e2 is connected by resistor R4 to the common lead L1. The collector electrode C2 of transistor Q2 is connected to a stationary or fixed back contact of a signaling relay (not shown) which controls movable contact La. In practice, the movable contact La is picked up and released by the energization and deenergization of a low speed signaling relay which may be part of a three speed railway cab signaling system as shown and described in U.S. Pat. No. 2,462,454. With the absense of a low speed command signal, the low speed relay is deenergized so that contact La is released and connects collector electrode c to terminal t3 which is supplied by a suitable d.c. source (not shown) of a positive operating voltage +V which may be referred to as a HOLD signal. The a.c. output signals produced by output transistor Q2 are taken from emitter electrode e2 and are fed to the input of gating circuit 22.

The gating circuit 22 takes the form of a two input OR gate including a pair of voltage doubling rectifier networks RN1 and RN2. The voltage doubler RN1 is made up of a pair of capacitors C4 and C5 and a pair of diodes D2 and D3. The emitter electrode e2 is connected by capacitor C4 to the junction point of the anode of diode D2 and the cathode of diode D3. The cathode of diode D2 is connected to the common conductor or lead L1. The anode electrode of diode D3 is connected to one plate of capacitor C5 which forms the output terminal OT1 and is one input to the multiple input gate 5 as will be described in detail hereinafter. The voltage doubler RN2 is identical to rectifier RN1 and includes a pair of capacitors C6 and C7 and a pair of diodes D4 and D5. The a.c. input signals applied to rectifier RN2 and produced by an a.c. amplifier including NPN transistor Q3 which is connected as an emitter-follower. The transistor Q3 includes an emitter electrode e3, a collector electrode c3 and a base electrode b3. As shown, the base electrode is connected to an a.c. input signal terminal t5 via a series connected resistor R5 and capacitor C8. The base electrode b3 is also connected to common lead L1 via diode D6 while the emitter electrode e3 is connected to common lead L1 via load resistor R6. The collector electrode c3 is connected to the stationary front contact of the low speed relay which is selectively connected to the positive supply voltage +V as will be described hereinafter. The output emitter electrode e3 is connected by means of capacitor C6 to the junction point formed between anode of diode D4 and the cathode of diode D5. The cathode of diode D4 is conneced to the common lead L1. The anode of diode D5 is connected to one plate of capacitor C7 which is connected to output terminal OT1 while the other plate of capacitor C7 is directly connected to lead L1. Thus, either the negative d.c. voltage produced by rectifier RN1 or the negative d.c. voltage produced by rectifier RN2 will appear on output terminal OT1 and, in turn, will be applied to input line I1 which forms one input to the multiple input gate 5.

It will be noted that the capacitor C4 and diode D2 along with diode D7 and capacitor C9 form another voltage doubling rectifier network RN3 which produces a negative d.c. voltage feedback operation potential for the collector electrode e1 of the first stage transistor Q1 once it has been set by the voltage doubling rectifier network RN4 which rectifies the a.c. voltage signals which are amplified by NPN transistor Q4. The transistor Q4 includes an emitter electrode e4, a collector electrode c4 and a base electrode b4. The base electrode b4 is coupled to an a.c. input terminal t6 via a series connected resistor R7 and capacitor C10. The base electrode b4 is also connected to common lead L1 via diode D8, and the emitter electrode e4 is connected to common lead L1 via load resistor R8. It will be noted that the collector electrode c4 of transistor Q4 is connected to lead L2 which, in turn, is connected to an acknowledging switch which will be described in greater detail hereinafter. The a.c. signals developed on emitter electrode e4 are fed to the rectifier network RN4 which is formed by capacitors C9 and C11 and a pair of diodes D9 and D10. The emitter electrode e4 is coupled to the junction point formed between anode of diode D9 and the cathode of diode D10 by capacitor C11. The cathode of diode D9 is connected to common lead L1 while the anode of diode D10 is connected to the upper plate of capacitor C9 and forms output terminal OT. The lower plate of capacitor C9 is coupled to the common lead L1. It will be noted that the terminal OT is also a common point for the output of rectifier RN3 formed by capacitors C4 and C9 and diodes D2 and D7.

Turning now to FIG. 2B, there is shown the second or the medium speed responsive latching and gating circuit 3 which includes latch 31 and gate 32. Like latching circuit 21, the latching circuit 31 is also made up of two active stages including PNP transistor Q5 and NPN transistor Q6. The first transistor Q5 includes an emitter electrode e5, a collector electrode c5 and base electrode b5 while the second transistor Q6 includes an emitter electrode e6, a collector electrode c6 and a base electrode b6. It will be seen that the base electrode b5 is connected by series connected resistor R9 and capacitor C17 to a source of a.c. input signals which are applied to terminal t7. The emitter electrode e5 is directly connected to common lead L1 and is also connected to the base electrode b1 via reverse voltage protection diode D11. The collector electrode C5 is coupled by load resistor R10 to a voltage doubling rectifier which provides the necessary negative operating voltage for the first stage of the latching circuit 31 as will be described hereinafter. The a.c. input signals produced by amplifying transistor C5 are taken from the collector electrode c5 via four-terminal capacitor C13. As shown, the collector electrode C5 is connected to one of the two terminals of the upper plate of capacitor C13 while one of the two terminals of the lower plate is connected to common lead L1. The remaining two terminals of the four-terminal capacitor C13 are coupled to the input of the second transistor stage of latching circuit 31. As shown, the other terminal of the upper plate of capacitor C13 is coupled to the base electrode b6 via coupling capacitor C14 while the other terminal of the lower plate of capacitor C13 is connected to common lead L1. The base electrode b6 is also connected to lead L1 via resistor R11 while the emitter electrode e6 is connected by load resistor R12 to lead L1. It will be seen that the collector electrode c6 is directly connected to the fixed or stationary back contact of a medium speed signal relay (not shown) which controls movable contact Ma. It will be appreciated that the movable contact Ma is picked up and released in accordance with the energization and deenergization of the electromagnetic coil of the medium speed relay of the cab signaling system. Thus, in the absence of a medium speed command signal the coil of the medium speed relay is deenergized and the movable contact Ma is released so that a circuit is completed over the back contact and the movable contact Ma to terminal t9 which is connected to a suitable source of positive d.c. voltage +V which may be termed a HOLD signal for the latching circuit 31. The a.c. output from the second transistor Q6 is derived from emitter electrode e6 and is applied to a voltage doubling rectifier network RN5 which forms part of the gating circuit 32.

The gating circuit 32 takes the form of an OR gate including voltage doubler RN5 as well as voltage doubling rectifier network RN6. The voltage doubling rectifier RN5 is made up of a pair of capacitors C15 and C16 and a pair of diodes D12 and D13. The emitter electrode e6 is connected by capacitor C15 to the junction point of anode of diode D12 and cathode of diode D13. The cathode of diode D12 is connected to lead L1 while the anode of diode D13 is connected to the upper plate of capacitor C16 which forms output terminal OT2 and is a second d.c. input I2 to the multiple or four input AND gate 5. The lower plate of capacitor C16 is connected to lead L1. The voltage doubling rectifier network RN6 also includes a pair of capacitors C17 and C18 and a pair of diode rectifiers D14 and D15. The a.c. input signals applied to rectifier network RN6 are produced by an a.c. amplifier including NPN transistor Q7 which has an emitter electrode e7, a collector electrode c7 and a base electrode b7. As shown, the base electrode b7 is connected to an a.c. input signal terminal t8 via a series connected resistor R13 and capacitor C18. The base electrode b7 is also connected to lead L1 via diode D16. The emitter electrode e7 is connected to lead L1 via load resistor R14. The collector electrode c7 is connected to the fixed front contact of the medium speed command relay which is connectable to the positive voltage +V on terminal t9 by movable contact Ma when the relay is picked up, as will be described in detail hereinafter. As shown, the a.c. signals produced by polarity inverting amplifying transistor Q7 are applied to voltage doubling rectifier network RN6. The negative d.c. output voltage produced by rectifier RN6 is delivered to output terminal OT2 and, in turn, to input lead I2 which forms another input to the multiple input gate 5. It will be seen that the capacitor C15 and diode D12 along with diode D17 and capacitor C19 form another voltage doubling rectifier network RN7 which provides a negative d.c. voltage feedback operating potential for the collector electrode c5 of the first stage transistor Q5 once it has been set by the voltage doubling rectifier network RN8 which rectifies the a.c. voltage signals which are amplified by NPN transistor Q8. The transistor Q8 includes an emitter electrode e8, a collector electrode c8 and a base electrode b8. The base electrode b8 is coupled to an appropriate a.c. input terminal t10 via series connected resistor R15 and capacitor C20. The base electrode b8 is also connected to a common lead L1 via diode D18 and the emitter electrode e8 is connected to lead L1 via load resistor R16. It will be observed that the collector electrode c8 is connected to lead L2 which as previously mentioned is connected to the acknowledging switch. The amplified a.c., signals produced an emitter electrode e8 are fed to the voltage doubling rectifier RN8 which is formed by a pair of capacitors C19 and C21 and a pair of diodes D19 and D20. As shown, the emitter electrode e8 is connected to the junction point form between the anode of diode D19 and the cathode of diode D20 via capacitor C21. The cathode of diode D19 is directly connected to lead L1 while the anode of diode D20 is connected to the upper plate of capacitor C19 and forms the SET output terminal OT3. The lower plate of capacitor C19 is directly connected to common lead L1. It will be seen that the output terminal OT3 is also common to the output of voltage doubling rectifier RN7 formed by capacitors C15 and C19 and diodes D17 and D20.

Let us now turn to FIG. 2C of the drawings, wherein there is illustrated the third or the high speed responsive latching and gating circuit 4 which includes latch 41 and gate 42. As shown, latching circuit 41 is designed to have two active amplifying stages including a PNP transistor Q9 and and NPN transistor Q10. The first transistor Q9 includes an emitter electrode e9, a collector electrode c9 and a base electrode b9 while the second transistor Q10 includes an emitter electrde e10, a collector electrode c10 and a base electrode b10. It will be noted that the base electrode b9 is coupled by series connected resistor R17 and capacitor C22 to a source of a.c. input signals which are applied to terminal t11. The emitter electode e9 is directly connected to lead L1 and is also coupled to the base electrode b9 via a reverse voltage protection diode D2. The collector electrode C9 is coupled by resistor R18 to a voltage doubling rectifier network which supplies operating voltage to the first stage as will be described in detail hereinafter. The amplified a.c. signals are taken from the collector electrode c9 and are fed to the input of the second stage of the latching circuit 41 via a four-terminal capacitor C23. As shown, the upper plate has one terminal connected to collector electrode c9 and has the other terminal connected to the base electrode b10 via coupling capacitor C24. The two terminals of the lower plate of capacitor C23 are connected to and form continuity for lead L1. The base electrode b10 is also connected to lead L1 via resistor R19 while the emitter electrode e10 is connected to lead L1 via load resistor R20. It will be observed that the collector electrode c10 is directly connected to the fixed or stationary back contact of a high speed relay (the coil of which is not shown) which controls the movable contact Ha. It will be recognized that the movable contact element Ha is picked up and released in accordance with the energization and deenergization of the electromagnetic coil of the high speed command relay of the three speed cab signaling system. Hence, in the absence of a high speed command signal the coil of the high speed relay is deenergized so that the high speed movable contact Ma assumes a released position and completes a circuit over back contact to terminal t12 which is connected to a suitable source of positive d.c. voltage +V which may be termed a HOLD signal for latching circuit 41. The a.c. output from the second transistor Q0 is derived from the emitter electrode e10 and is applied to a voltage doubling rectifier network RN9 which supplies feedback voltage for the latching circuit and to a first clamping circuit CC1 for gating circuit 42.

It will be noted that a capicitor C25 and a diode D22 are common to both the voltage doubling rectifier network RN9 and the clamping circuit CC1. The emitter electrode e10 is connected to the junction point formed by the cathode of diode 22 and the cathodes of diodes D23 and D24 via capacitor C25. The cathode of diode D22 is connected to lead L1 while the anode of diode D24 is connected to terminal point OT4. The anode of diode D23 is connected to the junction point formed by resistors R21 and R22. The other end of resistor R21 is connected to lead L1 while the other end of resistor R22 is connected to output terminal OT5 which is the a.c. input Iac to the four input AND gate 5.

The other input to the a.c. OR gate 42 is supplied by a second clamping circuit CC2 which includes a pair of resistors R23 and R24, a pair of diodes D24 and D25 and a capacitor C26. The a.c. signals applied to clamping circuit CC2 are produced by an a.c. amplifier including NPN transistor Q11 which has an emitter electrode e11, a collector electrode c11 and a base electrode b11. As shown, the electrode b11 is connected by series connected resistor R25 and capacitor C27 to a source of a.c. signals which are applied input terminal t13. The base electrode b11 is also connected to lead L1 via diode D27. The collector electrode c11 is directly connected to the fixed front contact of the high speed command relay which is connectable to the positive supply voltage +V on terminal t12 by the movable contact Ha when the relay is picked up, as will be described in greater detail hereinafter. The emitter electrode e11 is connected to lead L1 via load resistor R26. The amplified a.c. signals are derived from the emitter electrode e11 and are coupled by four-terminal capacitor C28 to clamping circuit CC2. As shown, the emitter electrode e11 is connected to one terminal of the upper plate of capacitor C28 while the other terminal of the upper plate of capacitor C28 is connected to one plate of capacitor C26. The two terminals of the lower plate of capacitor C28 are connected to and form part of common lead L1. The other plate of capacitor C26 is connected to the junction between the anode of diode D24 and the cathode of diode D25. The cathode of diode D24 is connected to lead L1 while the anode of diode D25 is connected to the junction point formed between resistors R23 and R24. The other end of resistor R23 is connected to lead L1 while the other end of resistor R24 which forms the other input to OR gate 42 is connected to output terminal OT5.

The a.c. signals developed on emitter electrode e11 are also fed to a voltage rectifier network RN11 which includes a capacitor C29 and a pair of diodes D26 and D28. The junction point formed between the anode of diode D26 and the cathode of diode D28 is connected to the emitter electrode e11 via capacitor C29. The cathode of diode D26 is connected to lead L1 while the anode of diode D28 is coupled to the second d.c. input lead I2.

As previously mentioned, the a.c. signals developed on emitter electrode e10 are applied to a voltage doubling rectifier network RN9 which consists of capacitor C25, diodes D22 and D24 and a capacitor C30. The voltage doubling rectifier network RN9 provides a negative d.c. feedback voltage for operating the first stage of the latching circuit 41 so that once the transistor Q9 has been set by negative supply potential produced by voltage doubling rectifier network RN10, the feedback voltage will maintain transistor Q9 in a conductive condition. The rectifier network RN10 rectifies the a.c. signals which are received from the amplifying transistor Q12. The NPN transistor Q12 includes an emitter electrode e12, a collector electrode c12 and a base electrode b12. The base electrode b12 is connected by a series connected resistor R28 and a capacitor C31 to terminal t14 which is supplied with a suitable source of a.c. input signals. The base electrode b12 is also connected to lead L1 via diode D30. The emitter electrode e12 is connected to lead L1 via load resistor R29. The a.c. signals developed on emitter electrode e12 are fed to rectifier network RN10. As shown, the emitter electrode e12 is coupled to the junction point formed between the anode of diode D31 and the cathode of diode D32 via capacitor C32. The cathode of diode D31 is directly connected to lead L1 while the anode of diode D32 is coupled to output terminal OT4. It will be seen that the collector electrode c12 is connected to lead L2 which, as previously mentioned, is connected to the acknowledging switch AS. The acknowledging switch is preferably a spring-loaded push-button type of switching device having a normally opened front contact point a and a normally closed back contact point b which are selectively connected to a negative d.c. voltage −V appearing on terminal t14 by movable contact c. As shown in FIG. 2C, the contact point a is connected to one end of a charging capacitor C33 while the other end of the capacitor is connected to lead L2 for providing a positive d.c. SET signal for transistors Q4, Q8 and Q12. The one end of capacitor C33 is connected to lead L1 via resistor R30 while the other end of capacitor C33 is connected to lead L1 via diode D33.

Figure 2D:
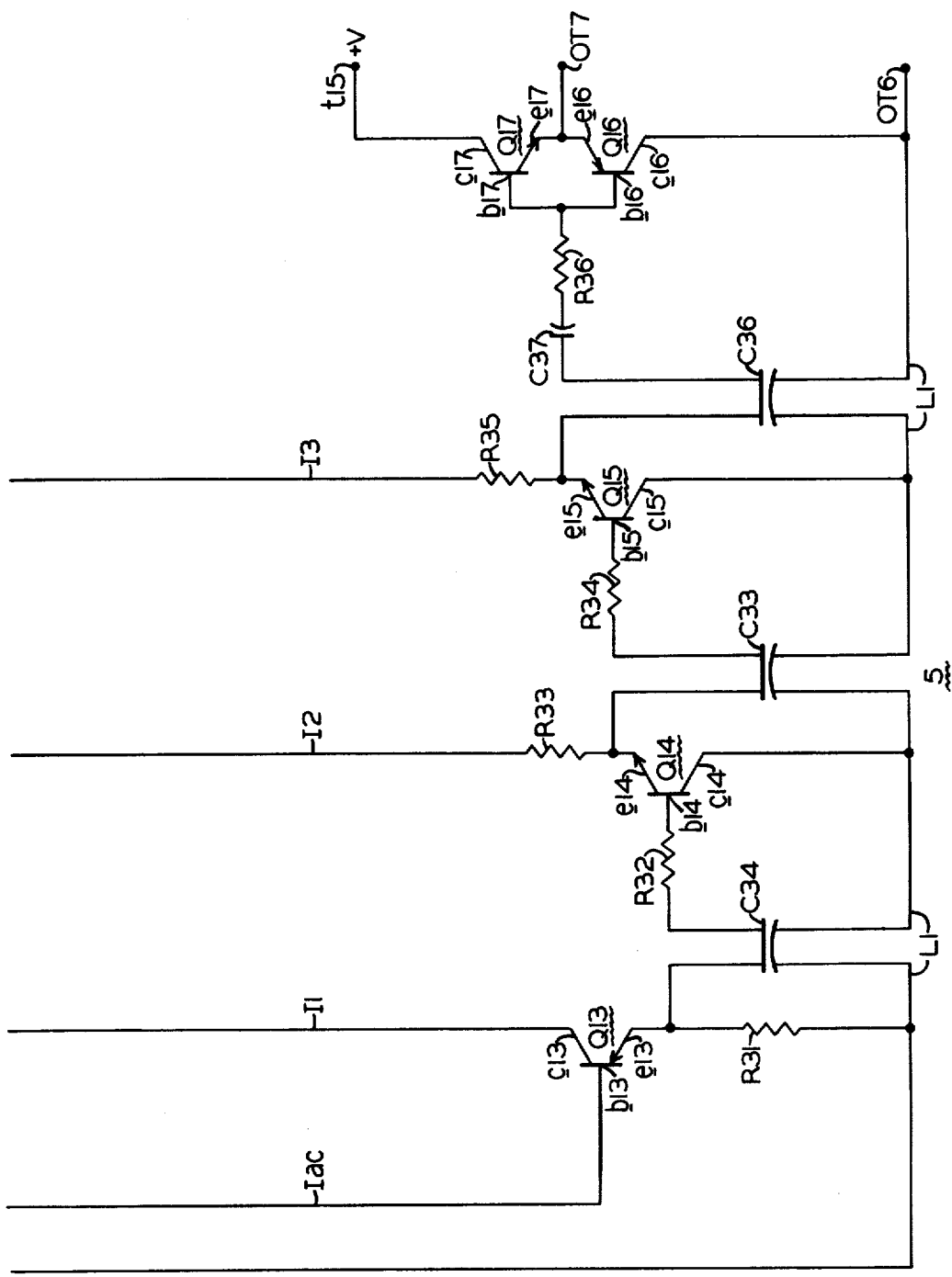

It will be noted that the contact point b is connected to and provides the third d.c. input I3 to the four input AND gating circuit 5. As shown in FIG. 2D, the AND gate 5 includes three emitter-follower stages followed by a fourth stage power output amplifier. The first emitter-follower stage includes a PNP transistor Q13 having an emitter electrode e13, a collector electrode c13 and a base electrode b13. The base electrode b13 is connected to the a.c. input Iac while the collector electrode c13 is connected to the d.c. input lead I1. The emitter electrode e13 is coupled to common lead L1 via load resistor R31. The output of the first emitter-follower is coupled to the input of the second emitter-follower stage via a four-terminal capacitor C34. As shown, one of the upper terminals of capacitor C34 is directly connected to emitter electrode e13 while the other upper terminal is connected to the base electrode b14 of NPN transistor Q14 via resistor R32. The two lower terminals of capacitor C34 are connected in common to lead L1. The collector electrode c14 of transistor Q14 is connected to lead L1 while emitter electrode e14 is connected through load resistor R33 to the d.c. input lead I2. The output from the second emitter-follower stage is coupled to the input of the third emitter-follower stage via a four-terminal capacitor C33. It will be noted that the one of the upper terminals of capacitor C33 is connected to emitter electrode e14 while the other upper terminal of capacitor C33 is connected to base electrode b15 of NPN transistor Q15 via resistor R34. The collector c15 of transistor Q15 is directly connected to lead L1 while the emitter electrode of transistor Q15 is connected to the third d.c. input lead I3 via resistor R35. The output of the third emitter-follower stage is connected to the input of the output power stage via four-terminal capacitor C36. The power amplifier output stage includes a pair of complementary type of transistors Q16 and Q17. The PNP transistor Q16 includes an emitter electrode e16 and a base electrode b16 while the NPN transistor Q17 includes an emitter electrode e17, a collector electrode c17 and a base electrode b17. As shown, the base electrodes b16 and b17 are directly connected together and, in turn, are connected to one of the upper terminals of capacitor C36 via the series connected resistor R36 and capacitor C37. The other upper terminal of capacitor C36 is directly connected to the emitter electrode e15 of transistor Q15. The two lower terminals of capacitor C36 are connected in common to lead L1. The collector electrode c16 is directly connected to lead L1 which is connected to output terminal OT6 while the collector electrode c17 is connected to a terminal t15 which is supplied with a positive d.c. operating potential +V. The emitter electrodes e16 and e17 are interconnected and provide an output terminal OT7. In practice, the output terminals OT6 and OT7 are appropriately connected to suitable alarm apparatus such as a vital relay and a warning device for alerting a trainman or operator of the vehicle under certain conditions, as will be described in the following discourse of the operation of the acknowledging circuit.

Turning now to the operation, it will be assumed that the circuit is intact, that all the components are functioning properly and that the d.c. supply voltages and the a.c. input signals have first been applied to terminals t1-t15. Further, it will be assumed that the vehicle is at a standstill and that no speed command signal has been received onboard. Under this condition, the three speed command relays are deenergized and the low, medium and high speed movable contacts La, Ma and Ha are released and are in contact with their respective back contacts. Thus, the positive d.c. supply or HOLD voltage +V applied to terminals t3, t9 and t12 is connected to the collector electrodes of transistors Q2, Q6 and Q10, respectively. While a.c. input signals are applied to terminals t1, t7 and t11, amplifying transistors Q1, Q5 and Q9 will not produce any a.c. output signals since no d.c. operating or SET voltage is available on the respective collector electrodes due to the non-conduction of transistors Q4, Q8 and Q12. Similarly, transistors Q3, Q7 and Q11 will not produce any amplified a.c. output signals even though a.c. input signals are applied to terminals t5, t8 and t13 since there is no d.c. operating voltage applied to collector electrodes c3, c7 and c11 due to the deenergized state of the low, medium and high speed command relays. Hence, there is no negative voltage on output terminals OT1, OT2 or OT5 of two input OR gates 22, 32 and 42, respectively, due to the lack of a.c. signals for voltage doubling rectifiers RN1 or RN2, RN5 or RN6 and RN11 as well as for clamping circuits CC1 or CC2. Accordingly, there is no negative d.c. input on leads I1 and I2 and no a.c. input on lead Iac for AND gate 5 so that there is no a.c. output voltage available across terminals OT6 and OT7. The lack of any a.c. output voltage on terminals OT6 and OT7 results in the actuation of the warning device due to the deenergization of the vital relay.

In order to deactivate the warning device, the operator or trainman must depress the acknowledging switch AS thereby opening the contact point b and closing contact point a. Thus, the negative voltage −V applied to terminal t14 is connected, by movable contact c through contact point a, to the charging capacitor C33. It will be appreciated that the rate of charge is relatively fast since the diode D33 exhibits a relatively low resistance. Thus, it is simply necessary to momentarily depress the push-button acknowledging switch AS to charge the capacitor C33. When the button AS is released, the potential charge on capacitor C33 supplies the necessary positive d.c. supply voltage for powering transistors Q4, Q8 and Q12 so that they are rendered conductive. The conduction of transistor Q4 causes the a.c. signals on terminal t6 to be amplified and thus rectified by voltage doubler RN4 so that a negative SET operating voltage is supplied to the collector c1 to render transistor Q1 conductive. Thus, the a.c. signals on terminal t1 are amplified by the first stage and are applied to the second stage of latching circuit 21. Since the collector electrode c2 already has a positive HOLD operating voltage supplied over the back and movable contact La, the a.c. signals are amplified by transistor Q2 and are rectified by voltage doubling network RN1 of OR gate 22 so a negative voltage appears on output terminal OT1 and is applied over lead I1 to the collector C13 of the emitter-follower transistor Q13.

The latching and gating circuit 3 functions in a similar manner in that the potential charge on capacitor C33 renders transistor Q8 conductive, and it, in turn, causes transistor Q5 to conduct and supply a.c. signals to transistor Q6. The amplified a.c. signals are then rectified by network RN5 to produce a negative voltage on output terminal OT2 which is conveyed over lead I2 to transistor Q14.

In a like manner, the latching and gating circuit 4 is activated by the potential on capacitor C33. The charge on capacitor C33 causes transistor Q12 to conduct and supply a.c. signals to rectifier network RN10. The rectified negative voltage powers transistor Q9 so that amplified a.c. signals are applied to input of transistor Q10 which, in turn, supplies amplified a.c. signals to the clamping circuit CC1 of OR gate 42. The a.c. signals appearing on output terminal OT5 are conveyed over lead Iac to the base electrode b13 of the first emitter-follower stage of the AND gate 5.

When the push-button switch AS is released, the biasing spring returns movable contact c into engagement with contact point a so that the negative voltage −V on terminal t14 is conveyed over lead I3 to the third emitter-follower stage including transistor Q15. Accordingly, with all four inputs present on the multiple input AND gate 5, an a.c. output voltage is developed across output terminals OT6 and OT7. The output voltage causes the energization of the vital relay which in turn deactivates the warning device such as a bell or buzzer, etc., of the alarm apparatus of the cab signaling equipment. The releasing of the push-button switch AS also opens the contact point a which causes the capacitor C33 to begin discharging through R30 and diode D33. When the charge on the capacitor is sufficiently dissipated, the transistors Q4, Q8 and Q12 will become nonconductive so that no amplified a.c. signals are supplied to voltage doubling rectifier networks RN4, RN8 and RN10 respectively. However, negative d.c. operating voltage is supplied and fed back by voltage doubling rectifier networks RN3, RN7 and RN9 to maintain the respective transistors Q1, Q5 and Q9 conductive. Thus, a.c. signals will be available for the voltage doubling rectifier networks RN1 and RN5 and for clamping circuit CC1 of OR gates 22, 32 and 42 even though the transistors Q4, Q8 and Q12 are no longer conductive.

Now let us assume that a given speed command signal, namely, a medium speed command signal M, has been received onboard the vehicle. Under this condition, the medium speed command relay will become energized so that the movable contact Ma will become picked up thereby opening its back contact and closing its front contact. The opening of the back contact of the medium speed relay removes the positive supply voltage +V from the collector electrode c6 so that a.c. input signals are no longer fed to the one voltage doubling rectifier network RN5 of the OR gate 32. However, the closing of the front contact by movable contact Ma causes the positive supply voltage +V of terminal t9 to be applied to collector electrode c7. Thus, the a.c. input signals applied to base electrode b7 are amplified by transistor Q7 and are fed to the other voltage doubling rectifier network RN6 of OR gate 32 so that a negative a.c. voltage continues to appear on output terminal OT2. Thus, the AND gate 5 continues to receive all four inputs so that the output voltage appearing on terminals OT6 and OT7 keeps the vital relay energized so that no warning or alarm is activated upon the reception of a less restrictive or increased speed command signal.

Similarly, if another less restrictive or higher speed command signal is received onboard the high speed command relay will become energized so that movable contact Ha is shifted from its back to its front contact while movable contact Ma will drop due to the loss of the medium speed command. This causes the transistor Q10 to cease conducting but results in the conduction of transistor Q11. The conduction of transistor Q11 results in clamping circuit CC2 supplying OR gate 42 rather than the clamping circuit CC1 so that the necessary a.c. input signals continue to be supplied over lead Iac to AND gate 5. In addition, the conduction of transistor Q11 results in the production of negative d.c. voltage by rectifier network RN9 which is conveyed to d.c. input lead I2 to take the place of the d.c. voltage which had been supplied by latch 3. It will be appreciated that this particular type of connection between latches 2 and 3 is not used between latches 1 and 2 in the example illustrated because the low speed relay responds to all three codes and does not drop when a higher speed relay is energized. Thus, the AND gate continues to produce an a.c. output for holding the vital relay energized and for preventing the initiation of an alarm signal so that the operator or trainman is not required to acknowledge the reception of a higher speed command signal.

Let us now assume that the high speed command relay is energized at the time and that a more restrictive or lower speed command signal, namely, a medium speed command signal is received by the car-carried cab signal equipment. Under this condition, the high speed command relay becomes deenergized and the medium speed command signal relay becomes energized. The energization of the medium speed command relay causes movable contact Ma to open its back contact and to close its front contact. The opening of the back contact results in the removal of the positive operating voltage +V from the collector electrode c6 so that the transistor Q6 is rendered nonconductive and no longer supplies a.c. signals to the voltage doubling rectifier network RN5 or OR gate 32. However, the closing of the front contact by movable contact Ma causes the application of the positive supply voltage +V to the collector electrode c7. The presence of the positive supply voltage results in the conduction of transistor Q7 which, in turn, results in the production of amplified a.c. signals. The a.c. signals are rectified by the voltage doubling rectifier network RN6 of OR gate 32 so that a negative d.c. voltage continues to be developed on lead I2 for the four input AND gate 5. It will be appreciated that the reception of the medium speed command signal results in the disappearance of the high speed command signal so that high speed relay becomes deenergized. The deenergization of the high speed command relay results in the release of movable contact Ha whereby its front contact opens and its back contact closes. The opening of the front contact causes the removal of the positive d.c. supply voltage +V from the collector electrode c11 so that transistor Q11 is rendered nonconductive. Thus, a.c. input signals are no longer available for voltage clamping network CC2, and no a.c. output voltage is developed on terminal OT5. Thus no a.c. input voltage is conveyed by lead Iac to the base electrode b13 of the first stage emitter-follower transistor Q13. This results in the interruption of the a.c. output signals across terminals OT6 and OT7 which thereby causes the deenergization of the vital output relay (not shown) and results in the actuation of the alarm or warning device. While the deenergization of the high speed relay results in the closing of the back contact by movable contact Ha and the application of the positive d.c. supply voltage +V to the collector electrode c10, the latching circuit 4 is unable to produce any a.c. signal due to the nonconductive condition of transistor Q9. In order to shut off the alarm, it is necessary to reestablish an a.c. input on lead Iac for the AND gate circuit. Thus, it is necessary to again establish a SET or negative d.c. operating voltage on output terminal OT4 for collector electrode c9. This is accomplished by momentarily depressing the spring-loaded push button acknowledging switch AS thereby closing contacts a-c and applying the negative d.c. voltage +V to charging capacitor C33. Thus, upon release of button AS, the positive potential charge on the capacitor is again applied to collector electrode c12 so that transistor Q12 is rendered conductive and supplies amplified a.c. signals to the input of voltage doubling rectifier network RN10. The network rectifies the a.c. signals and produces a negative d.c. operating voltage on terminal OT4. The presence of the negative voltage on collector electrode c9 renders the transistor Q9 conductive so that amplified a.c. signals are developed on the output of latching circuit 41. Thus, the clamping network CC1 of OR gate 42 produces an a.c. voltage on output terminal OT5 which is conveyed by lead Iac to the base electrode b13 of the first stage emitter-follower transistor Q13 of AND gate 5. The release of the pushbutton switch AS also results in the application of the negative d.c. voltage −V over contacts b-c and lead I3 to the third stage emitter-follower including transistor Q15. Thus, all four of the inputs are present on the AND gate, and accordingly, a.c. output signals are again developed on terminals OT6 and OT7. The presence of the a.c. output signals on terminals OT6 and OT7 results in the energization of the vital relay and causes the deactivation of the alarm. In practice, the reception of a more restrictive speed command signal requires that the trainman or operator must initiate an acknowledgment by depressing switch AS within a given time limit, normally, several seconds, or the cab signaling equipment will automatically call for an emergency braking action which will bring the train or transit vehicle to a complete stop. Hence, an increased speed command signal requires no action on the part of the operator, namely, depression of the spring-loaded push-button switch AS.

As previously mentioned, the presently described solid-state acknowledging circuit 1 operates in a failsafe manner in that no component or circuit failure is capable of producing or simulating a true or valid condition. It will be noted that the opening or shorting of the charging capacitor C33 eliminates the necessary positive d.c. operating voltage for transistors Q4, Q8 and Q12. Further, it will be observed that a sneak path from any of the d.c. supply sources or terminals to the output terminals OT(n) is incapable of simulating a valid condition since the polarity is opposite to that which is required, namely, the source voltages are positive while the output voltages are negative. The opening or shorting of any active or passive elements of the amplifying circuit results in the destruction of the a.c. amplifying characteristics of the d.c. biasing requirements. If the diodes or capacitors become open or short-circuited, the rectifying characteristics of the rectifiers RN(n) is nullified. Certain of the critical resistors are constructed of a special carbon composition in order to prevent them from becoming short-circuited. Further, the circuit is meticulously designed and laid out to preclude adjacent leads and conductors from crossing or touching each other. The use of the four-terminal capacitors ensures that the opening of a terminal or the loss of a lead wire will not result in an unsafe condition, namely, a higher load impedance on the transistor gate which might allow a signal to pass even when the transistor was not energized.

While this invention has been described with regard to a circuit arrangement for acknowledging more restrictive signals among a plurality of input signals for cab signaling applications, it is understood that the invention may be utilized in other systems and unrelated areas remote from railroad and/or mass and rapid transit operations.

It will be appreciated that the foregoing description of this invention is only illustrative, and it is not intended that the invention be limited to the exact embodiment described, and that other changes, modifications and alterations within the sphere of the appended claims may be made by those skilled in the art without departing from the spirit and scope of this invention.

Having now described the invention, what I claim as new and desire to secure by Letters Patent, is:

1. A fail-safe electronic circuit arrangement which requires an acknowledgment after the reception of a more restrictive input signal in order to reestablish an output signal comprising, a plurality of latching means connectable to a separate one of a plurality of input signals having a predetermined order of more restrictive significance, one of a plurality of gating means cooperatively associated with a separate one of said plurality of latching means, and a multiple input gating means coupled to said plurality of latching and gating means for producing an output signal and conditioned upon the reception of a more restrictive input signal for causing the removal of the output signal.

2. A fail-safe circuit arrangement as defined in claim 1, wherein each of said plurality of latching means includes a pair of transistor amplifying stages.

3. A fail-safe circuit arrangement as defined in claim 1, wherein each of said plurality of gating means includes a two input OR gate.

4. A fail-safe circuit arrangement as defined in claim 1, wherein said multiple input gating means is a four input AND gate.

5. A fail-safe circuit arrangement as defined in claim 1, wherein each of said plurality of latching means including a first and a second amplifier, said first amplifier having its input coupled to a source of periodic input signals being set by a negative d.c. operating voltage for producing amplified a.c. signals, means coupling said amplified a.c. signals to the input of said second amplifier, said second amplifier being conditioned by a negative HOLD supply voltage for producing a.c. output signals.

6. A fail-safe circuit arrangement as defined in claim 1, wherein selected ones of said plurality of said gating means includes a pair of voltage doubling rectifier networks for producing a d.c. output voltage for said multiple input gating means.

7. A fail-safe circuit arrangement as defined in claim 1, wherein at least one of said plurality of said gating means includes a pair of clamping circuits for producing an a.c. output signal for said multiple input gating means.

8. A fail-safe circuit arrangement as defined in claim 1, wherein said multiple input gating means includes three emitter-follower stages and a complementary power output stage.

9. A fail-safe circuit arrangement as defined in claim 1, wherein said latching means is set by the actuation of a switch which supplies a charging voltage to the capacitor for providing operating potential to a transistor amplifier for providing a.c. signals to a voltage doubling rectifier network.

10. A fail-safe circuit arrangement as defined in claim 1, wherein said plurality of gating means includes a two input OR gate in which either the associated latching means supplies a.c. signals to one of the two inputs or a transistor amplifier supplies a.c. signals to the other of the two inputs when a less restrictive signal is received.

* * * * *